United States Patent
Catrein et al.

(10) Patent No.: US 9,699,418 B2
(45) Date of Patent: Jul. 4, 2017

(54) SYNCHRONIZATION OF CAMERAS FOR MULTI-VIEW SESSION CAPTURING

(75) Inventors: Daniel Catrein, Würselen (DE); Markus Kampmann, Aachen (DE); Thomas Rusert, Kista (SE); Frank Hartung, Herzogenrath (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1255 days.

(21) Appl. No.: 13/509,812

(22) PCT Filed: Nov. 17, 2009

(86) PCT No.: PCT/EP2009/065276
§ 371 (c)(1),
(2), (4) Date: Jul. 27, 2012

(87) PCT Pub. No.: WO2011/060809
PCT Pub. Date: May 26, 2011

(65) Prior Publication Data
US 2013/0128052 A1    May 23, 2013

(51) Int. Cl.
*H04N 7/18* (2006.01)
*H04N 5/232* (2006.01)
(Continued)

(52) U.S. Cl.
CPC ............ *H04N 7/181* (2013.01); *H04N 5/232* (2013.01); *H04N 5/23206* (2013.01);
(Continued)

(58) Field of Classification Search
None
See application file for complete search history.

(56) References Cited

U.S. PATENT DOCUMENTS

2005/0090294 A1* 4/2005 Narasimhan .......... H04L 29/06
                                                           455/575.1
2006/0001744 A1  1/2006 Singh
(Continued)

FOREIGN PATENT DOCUMENTS

EP    2124445 A1   11/2009
JP   H11261874 A    9/1999
(Continued)

OTHER PUBLICATIONS

Lou et al., Interactive Multiview Video Delivery Based on IP Multicast, Research Article, Received: Oct. 31, 2006; Accepted: Dec. 21, 2006, pp. 1-8, vol. 2007, Article ID 97535, Hindawi Publishing Corporation, Media Communication Group, Microsoft Research Asia, Beijing, China.
(Continued)

*Primary Examiner* — Jorge L Ortiz Criado
*Assistant Examiner* — Stefan Gadomski
(74) *Attorney, Agent, or Firm* — Coats and Bennett, PLLC

(57) ABSTRACT

Synchronizing cameras, connected via a telecommunication network, for capturing a multi-view session can be controlled by a synchronization module. The synchronization module determines a multi-view capturing parameter from a capturing parameter that is received from at least one camera. The multi-view capturing parameter is provided by the synchronization module to the cameras participating in the capturing session in order to synchronize the capturing of the multi-view session. Further, a camera device informs the synchronization module of the disposability and capturing parameter of the camera. The camera receives the multi-view capturing parameter for use in capturing the session.

17 Claims, 4 Drawing Sheets

(51) Int. Cl.
    *H04N 5/247*  (2006.01)
    *H04N 13/02*  (2006.01)
    *G08B 13/196*  (2006.01)
(52) U.S. Cl.
    CPC ......... *H04N 5/247* (2013.01); *H04N 13/0242* (2013.01); *H04N 13/0296* (2013.01); *G08B 13/19643* (2013.01)

(56) References Cited

U.S. PATENT DOCUMENTS

| | | | |
|---|---|---|---|
| 2006/0024041 A1* | 2/2006 | Lou et al. | 396/213 |
| 2009/0070127 A1* | 3/2009 | Florkey | G06F 9/542 |
| | | | 705/319 |
| 2009/0163185 A1 | 6/2009 | Lim et al. | |

FOREIGN PATENT DOCUMENTS

| | | |
|---|---|---|
| JP | 2003324649 A | 11/2003 |
| JP | 2004112770 A | 4/2004 |
| JP | 2006 217326 A | 8/2006 |
| WO | 2008102525 A1 | 8/2008 |
| WO | 2008153796 A2 | 12/2008 |

OTHER PUBLICATIONS

Litos et al., Synchronous Image Acquisition based on Network Synchronization, IEEE Computer Society Conference on Computer Vision and Pattern Recognition Workshop, Jun. 2006, pp. 1-6, DOI: 10: 1109/CVPRW.2006.200, Informatics and Telematics Institute, Thessaloniki, Greece.

\* cited by examiner

SYNCHRONIZATION OF CAMERAS FOR MULTI-VIEW SESSION CAPTURING

TECHNICAL FIELD

The present invention relates to a method and a device for synchronizing cameras capturing a multi-view session. In particular, the present solution may be applied for capturing a multi-view video of a scene with mobile cameras distributed around the scene.

BACKGROUND

In a traditional 2-dimensional (2D) presentation, one view of content, like video is generated and displayed on a 2D display. Current development goes into direction of 3-dimensional (3D) video presentation, which requires changes in the underlying technology of content generation and processing.

One existing method for the 3D content presentation is based on the stereoscopic technology, wherein two views of a scene are generated, one view for the right and the other view for the left eye. Both views are provided and displayed on a stereoscopic, also called stereo or 3D display. There exist a number of different stereo displays, like for example shutter glasses, polarized glasses, head mounted display, 3D-stereo-projectors. By observing slightly different views of the scene, the human brain integrates these views into a 3D representation.

A multi-view is a further method for 3D content presentation, which is based on capturing the same scene from different view points. The provision of 3D multi-view video comprises different aspects of the multi-view processing, starting from capturing and calibration to encoding, analysis and visualization. This technique provides the ability for users to interactively select a viewpoint of the scene. In case of a 2D display, one view is selected and displayed. In case of a 3D display, two views for the right and for the left eye are selected and displayed. The multi-view video is one example for a multi-view content, in the following also called multi-view session. A further example may be a multi-view image or multi-view TV.

A typical application for interactive multi-view video is a sport event, for example a football game in a stadium, wherein a football scene like penalty or foul can be viewed from different angles and the user has the possibility to change the view.

It is not enough to simply place cameras around the scene to be captured. Many applications like 3DTV, 3D Video and Free Viewpoint Video require a synchronized and calibrated capturing of multi-view video sequences. The geometry of the camera set up is measured by a process known as camera calibration, which synchronizes the cameras in space and time. Multi-view video capture varies from partial to complete coverage of the scene. Thus depending on the coverage a corresponding number of synchronized and calibrated cameras placed around the scene is required.

Conventional multi-view video capturing techniques follow a hardware-based approach. One example of the hardware-based approach is described in "Interactive Multiview Video Delivery Based on IP Multicast", Jian-Guang Lou, Hua Cai, and Jing Li, Advances in Multimedia Volume 2007 (2007). Herein a number of a priori calibrated video cameras are placed around a scene. All the cameras are specialized for capturing a multi-view scene and connected to a number of synchronization units which are further connected to a number of control PCs controlling a simultaneous operation. As a result, an event is captured from different point of views. Once the event is captured, the video signals are compressed in the control PCs and sent to the server through the network the control PCs are connected to. Thus this kind of solution has usually a backbone architecture for synchronizing the cameras and for processing the captured session. Consequently the realizations of the hardware based approaches are technically complex.

Another work ("Synchronous Image Acquisition based on Network Synchronization" by G. Litos, X. Zabulis, G. Triantafyllidis) describes a software-based solution for camera synchronization. Herein a cluster of computer clients with one or more attached cameras is described wherein the computers are connected by means of a network. The synchronization of computer clocks is done by means of the Network Time Protocol (NTP). Also this solution requires installation of complex backbone computer architecture around the captured scene.

US 2006/0001744 A1 proposes to connect a cluster of portable devices, like mobile phone, PDA, digital camera by means of an ad-hoc network, such as Bluetooth™. In this architectural arrangement once the ad-hoc network is formed, one of the devices is declared to be a leader device. The leader device sends a capture message to the other devices for initiating capturing of an image. Upon receipt of the message, the capture buttons of the other devices are triggered to capture an image essentially at the same time. Afterwards the devices send the taken pictures to the leader device for consolidation. Thus, this document deals with the necessity of synchronizing the time when capturing an image.

Based thereon it is to be concluded, that the existing solutions are often costly, technically complex and not flexible enough.

Accordingly, there is a need for synchronizing cameras capturing a multi-view session. In particular there is a need to provide a flexible and efficient architecture for providing a synchronized multi-view video.

SUMMARY

The invention is embodied in independent claims. Advantageous embodiments are described in the dependent claims.

It is proposed to provide a method for synchronizing cameras capturing a multi-view session. The cameras communicate via a telecommunication network. In one embodiment it is proposed that the telecommunication network is a wireless network and the cameras are able to communicate via a wireless connection. The proposed method is preferably performed in a synchronization module. At least one camera informs the synchronization module about its disposability for capturing a session providing at least one capturing parameter. The camera may inform either directly the synchronization module or any suitable server and the server forwards the disposability information to the synchronization module. Based on the capturing parameter of the at least one camera, a synchronization procedure for synchronizing the cameras capturing the multi-view session is performed resulting in provision of at least one multi-view capturing parameter. In a following step, the cameras capturing the multi-view session are notified to capture a session using the received multi-view capturing parameter.

Further it is proposed to provide a method, being preferably implemented in the camera device. In particular it is proposed that the camera sends disposability information comprising at least one capturing parameter of the camera towards a synchronization module. In the next step, the camera receives a notification message from the synchronization module comprising at least one multi-view capturing parameter for capturing the multi-view session. The received multi-view-capturing parameter is used for capturing a session. The camera may start the capturing either immediately after reception of the multi-view capturing parameter or at a later point in time, depending on the realisation.

Further, the present invention discloses a synchronization module adapted to synchronize cameras connected via a telecommunication network for capturing a multi-view session. The synchronization module has a receiver adapted to receive disposability information of at least one camera for capturing a session with provision of at least one capturing parameter of the camera. Further a synchronization processor is proposed for performing a synchronization procedure synchronizing the cameras capturing the multi-view session. The synchronization procedure is adapted to determine at least one multi-view capturing parameter. This is done by considering the capturing parameter of the individual cameras. Further the synchronization module comprises a sender which is adapted to notify the cameras capturing the multi-view session about the at least one multi-view capturing parameter.

The receiver, the synchronization processor and the sender are connected with each other in a way that allows exchange of information required to perform the embodiments of the present invention.

Further the synchronization module is adapted to perform all steps as claimed in connection with the method which is to be performed in said module.

The present invention discloses also a camera device, further also called camera connected via a telecommunication network with further camera devices for capturing a multi-view session. The camera has a sender adapted to send disposability information comprising at least one capturing parameter of the camera to a synchronization module. Further said camera comprises a receiver adapted to receive a notification message from the synchronization module comprising at least one multi-view capturing parameter for capturing the multi-view session, and a capturing unit adapted to capture a session.

The sender, the receiver and the capturing unit are connected with each other in a way that allows exchange of information required to perform the embodiments of the present invention.

Further the camera device is adapted to perform all steps as claimed in connection with the method which is to be performed in said device.

The advantage of the present invention is that the cameras are synchronized when capturing a multi-view session. In particular, the present invention allows synchronized capturing of a video sequence, so that when using two or more cameras, the video frames captured by different cameras correspond to the same picture.

Further advantage is that the synchronization of the cameras' capabilities results in a more efficient post processing while consolidating the individual sessions to generate a multi-view session.

DETAILED DESCRIPTION

Figure 1:
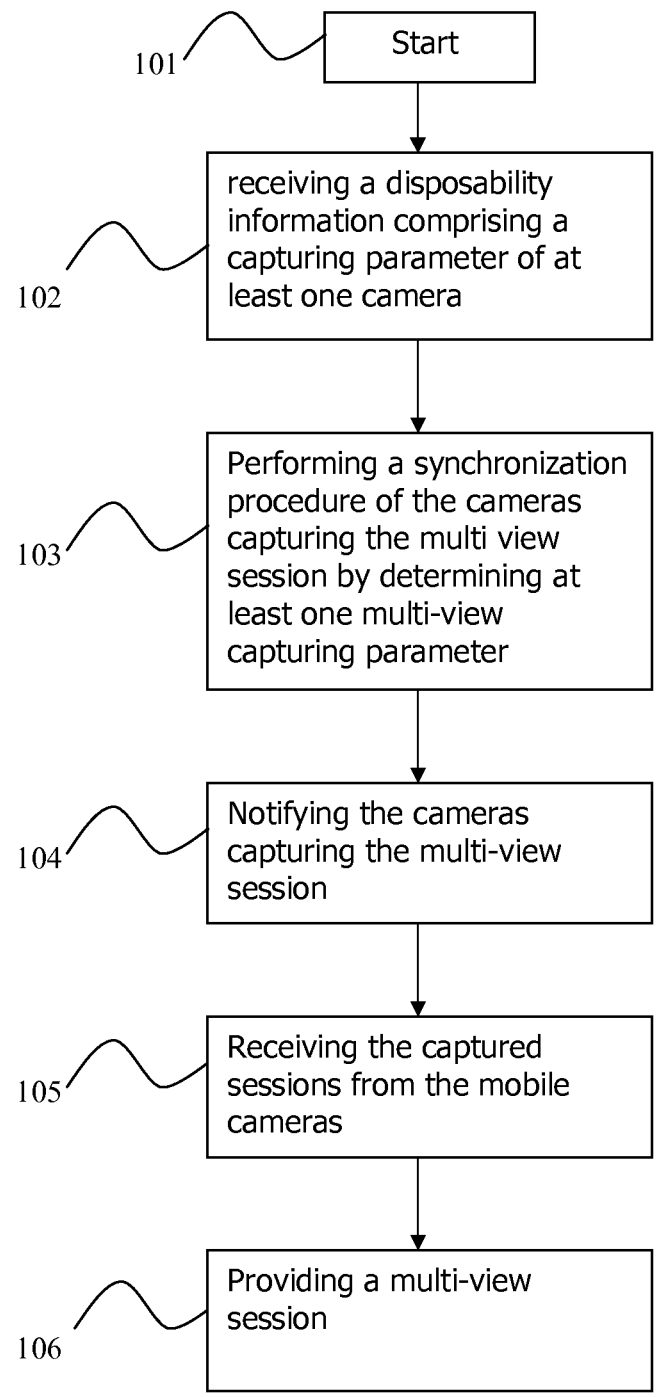
FIG. 1 is a flowchart illustrating an embodiment of the synchronization module.

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details.

The term "device", "module" in the context of the present invention refers to any suitable combination of hardware and software for providing a predetermined functionality in the communication network.

The term "camera" refers to any kind of camera device which is to be synchronized with other cameras. In one embodiment the camera is a portable camera connected via a wired telecommunication network. In a preferred embodiment it is proposed to have a portable camera connected to a device with a wireless connectivity, so that the cameras are able to communicate via the wireless connection. In a further embodiment it is proposed to provide a mobile phone with an integrated camera or any portable camera communicating with other cameras by means of mobile phones.

The synchronization module may be realized in any suitable and preferable way. It may be either a stand alone node or it may be part of any further node, like for example it may be integrated in a server or in a camera. The term "server" as used in the present invention is any suitable node in the network having the possibility to communicate with the synchronization module and with the cameras.

The present invention is applicable in any telecommunication network providing connectivity to the attached devices. Preferably, the telecommunication network is a wireless communication network, operating according to GSM, GPRS (General Packet Switched Radio), UMTS (Universal Mobile Telephone System), LTE (Long Term Evolution) or any 3G system like for example EDGE, WCDMA, CDMA2000, any IP-based network or DVB network, or Wimax network. As another example, the invention may also be implemented in short-range wireless networks such as WLAN, Wifi or Bluetooth systems or in wireline networks.

The multi-view session provides the ability for users to select a viewpoint of the captured scene. Thus, a number of cameras capture a scene, and the captured sessions of the individual cameras are consolidated in a way to generate a multi-view session. The multi-view session may be a multi-view video session or a multi-view image session. Further the multi-view capturing might have as a purpose either 3D or 2D presentation. In case of a 2D display, one view is selected and displayed. In case of a 3D display, two views for the right and for the left eye are selected and displayed. Thus, in order to generate a multi-view session either a multi-view sequences or stereo sequences with two sequences for the left and for the right eye, or depth maps are provided.

The depth maps, also called Z-buffer or depth buffer provides depth information of an object in a 3-D scene. The Z-buffer is used to solve the visibility issues, which occur when deciding which elements of a rendered scene are to be in the front, thus visible, and which are to be in the back, thus hidden. Rendering is a process of generating an image from a 3-D model, wherein the 3D model is a description of three-dimensional objects in a strictly defined language or data structure containing for example geometry, viewpoint, texture, lighting, and shading information. In other words while generating a 3-D image, the graphic hardware card stores in the depth map the depth information describing which object is located in front and which in back when considering the z-axis. With the present invention a synchronized capturing of pictures has the advantages that the depth estimation of the captured pictures is possible.

In the following, an embodiment of the present invention is presented in respect to FIG. 1 showing a flow chart with steps according to the present invention.

The steps as presented in FIG. 1 are preferably carried out in a synchronization module. In the first step, 101, the synchronization module is in a waiting state waiting for the reception of an event. The event starting the synchronization may be a signal either from one of the cameras or from a server requesting the capturing of a multi-view session.

In the following step, 102, disposability information is received. According to invention, this is achieved by publishing the disposability information of at least one camera in any preferably way.

In one embodiment it is proposed that the cameras register themselves in the system, in order to inform the system which cameras are disposable for capturing a session. The registration might be performed directly in the synchronization module located in the server, or in a server which provides the relevant disposability information to the synchronization module, or in a further camera, or in any node adapted to receive the registration. The registration might be performed in any suitable and preferably way. For example, the cameras may either register in advance or during capturing the session. The registration procedure may be performed either directly, for example a user may enter the required information in a web-based tool, or by sending a registration message via the telecommunication network.

Preferably, the cameras are to be informed about the possibility to capture a scene. In one embodiment the cameras may be informed a priori by receiving an announcement message over the telecommunication network about the possibility to attend in capturing a multi-view session. The advantage thereof is that the cameras might be invited dynamically. As an answer to the announcement message the cameras send an appropriate message informing about their disposability to capture a session. The realisation of the announcement message and of the appropriate registration message depends on the underlying technology.

For example in the GSM-based technology, a server may send a SMS message to all mobile phones located in the range of the event that is to be captured. The SMS message may include a reference to the capturing session, for example in form of a HTTP URL. Upon reception of the HTTP URL, the mobile phone that intends to participate in the capturing session indicates its participation using the received reference. The SMS message may be formatted in a way so that, when received by a mobile phone with integrated camera, this may trigger starting of a capturing application on the mobile phone.

In a further example when using a broadcast-based technology such as DVB or 3GPP MBMS, it is proposed to send an appropriate broadcast message to cameras in a certain area to inform said cameras about an event to be captured in said area. The broadcast message may again include a reference to the capturing session, that may be used in case they intend to participate in the capturing session.

The procedure of informing about the disposability of the cameras results in providing the capturing parameters of the cameras to the synchronization module. Moreover, the purpose of the synchronization module is to perform a synchronization procedure for synchronizing the cameras capturing a multi-view picture. This is depicted in FIG. 1, in step 103.

The capturing parameter may be any parameter being used in capturing a session. In one embodiment the capturing parameter is location and orientation of the camera. In particular for the multi-view session the synchronization in space, where space relates to both position and orientation of cameras, is an advantageous feature. A suited spatial distribution of cameras around a scene, for example in a stadium, is to be considered when deciding to capture either a complete scene or only parts thereof. The determination of the location and orientation of the camera may be performed by determining the position coordination of the camera, for example with the GPS system and with an integrated compass. Typically, the camera, for example when integrated in a mobile phone, is connected to a mobile network. Thus, information about the network's cell the phone is connected to, may be another part of the capturing parameter. The orientation information of the camera may further be refined if acceleration sensors are connected to the camera. In that case, the orientation relative to the ground surface can be obtained. This embodiment has the advantage that the location of the cameras is performed centrally and automatically ensuring that the determined locations of the cameras result in better and more precise distributions of the cameras.

In a further embodiment, the capturing parameter of the camera may be the technical capabilities of the camera, like for example the frame rate for capturing a session. Typically, a camera captures with a certain frame rate, like for example 10 frames per second, herein the video frames have a temporal distance of 100 ms. The present invention allows synchronized capturing at least in time, so that when using two or more cameras, the video frames captured by different cameras correspond to the same times, or to approximately the same times. In order to synchronize the frame rate it is proposed to compare the frame rates of the different cameras and to choose the best matching one. In one example it may be the slowest frame rate.

Further examples of capturing parameters on which the participating cameras are to agree on by providing a common multi-view parameter may be video codecs, storage space, duration of the capturing session, upload and/or upstreaming capabilities.

The synchronization of the cameras' capabilities results in a more efficient post processing while generating the multi-view session. To achieve the efficiency, preferably the frame rate and the spatial resolution of the cameras are to be synchronized.

Summarizing, the synchronization module generates a multi-view capturing parameter based on the knowledge of the individual capturing parameters of the participating cameras. The multi-view parameter resulting from the performed synchronization procedure may be either one parameter, like for example the location, preferably however further synchronized multi-view parameters are to be provided, like for example the frame rate. The multi-view capturing parameters depend on the kind of the multi-view session. As mentioned above the multi-view session may be a video but also a still image. Thus, if synchronizing a still image to enable 3D reconstruction from multiple cameras, the synchronization of frame rates is obsolete, however synchronization of capture time as well as location and orientation is still necessary.

Furthermore it is advantageously to synchronize the starting time to ensure that the cameras start capturing at the same time so that the same scene is taken. This may be realized using the Network Time Protocol (NTP). The NTP is designed to synchronize clocks of computers over a communication network and is standardized in RFC 1305. The NTP may be described in the light of the present invention as follows. The synchronization of the camera and of the synchronization module consists of several packet exchanges wherein each exchange is a pair of request and reply. When sending out a request, the synchronization module stores its own time (originate timestamp) into a data packet being sent. The camera receives such data packet and in turn stores its own time (receive timestamp) into the packet and returns it to the synchronization module after putting a transmit timestamp into said packet. Upon receipt of the reply packet, the synchronization module logs its own receipt time to estimate the traveling time of the packet. The traveling time (delay), when assuming symmetrical delays, is estimated to be half of the delay minus the processing time, which is determined using the logged timestamps. Consequently the synchronization procedure provides a starting time as a multi-view parameter.

In a further embodiment it is proposed that a server node provides further information to the synchronization module. The further information as provided by the server may be used during the synchronization procedure. For example during the determination of the multi-view parameters, friendship relation of the users may be considered. For this purpose, the cameras provide the relevant relation information during any kind of registration in the network. In one embodiment it is proposed that cameras belonging to a pre-defined and stored in the system friends ring are invited during the registration procedure to capture a scene. Thus, the multi-view parameter may be a list of user participating in the session.

Returning to FIG. 1, in step 104 cameras selected for capturing the multi-view session are notified and the multi-view capturing parameter is provided. The notification step may be performed at the beginning of the session by informing the cameras about the at least one multi-view capturing parameter. In a further embodiment it is proposed to perform the notifying step during the capturing of a session. For example, the synchronization module may instruct the camera to change its position in order to improve the coverage of the commonly captured scene. In this context, the synchronization module sends instructions to one or several users, notifying how they should try to adapt their location or orientation. Each user can then decide to follow the instruction, to ignore or to reject.

In one embodiment it is proposed that all cameras informing about their disposability for capturing a scene are chosen by the synchronization module. This may be realized by collecting the received registration messages form the cameras and by notifying the registered cameras to capture a session.

In another embodiment it is proposed to notify only selected cameras which are suitable for capturing a multi-view session. The selection step may be realised for example by comparing the capabilities of the cameras, wherein cameras with similar capturing capabilities are selected. Further as mentioned above, cameras registered to a friendship group may be selected. In another example, the transmission bandwidth in the network may be considered, so for example in case of a limited bandwidth it is proposed to select a limited number of cameras. In another embodiment it is proposed to consider the spatial location of the cameras, so that in case of a panoramic view a number of cameras located around the scene is selected and in case a stereo view is approached, only two cameras located appropriable are selected.

Further it is proposed that the capturing session starts with a certain number of different cameras without allowing new entries during the session. Another possibility comprises the admission of further cameras during the session, wherein the additional cameras may be either registered or in case they are invited spontaneously, the multi-view capturing parameter determined on the basis of the already registered cameras is provided to the additional cameras.

In the next step of FIG. 1, 105, the captured session is provided to a server. This step may be performed during capturing, for example the captured data may be upstreamed to the server. Alternatively, the captured session may be uploaded after recording the video locally. Preferably, auxiliary information like location, orientation, data frame is transferred to the server. With the auxiliary information an easier post processing of the multi-view session at a later stage is achieved.

In the next step, 106, a multi-view session is provided which is a consolidation of the individual sessions. This may be performed in any available and suitable way. In one embodiment it is proposed that the server distribute, upon reception of the captured sessions, the captured data to the registered cameras and the cameras perform individual post processing. The advantage thereof is that every camera has all necessary data so that an individual multi-view of a scene may be provided to the individual users.

Another possibility foresees a central post processing at the server combined with later distribution of the already processed multi-view session. In a further embodiment it is proposed that the server synchronizes the capture and the connected cameras produce a merged 3D model that is uploaded, rather than uploading the individually captured scenes.

Figure 2:
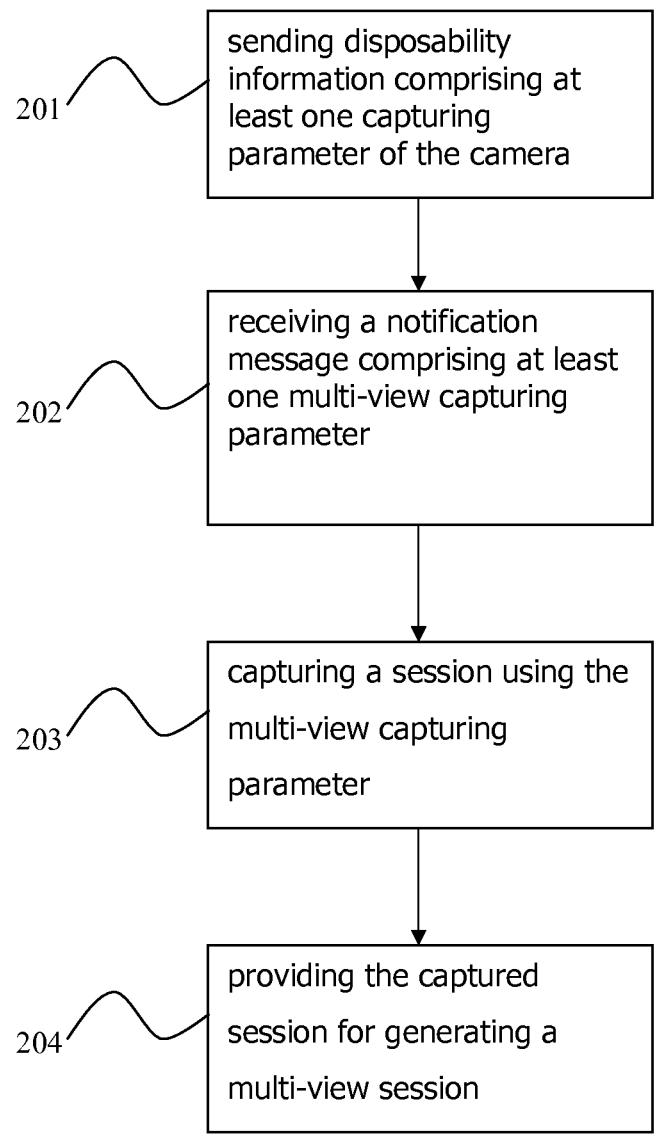
FIG. 2 is a flowchart illustrating an embodiment of the camera device.

In the following an embodiment of the present invention is presented in respect to FIG. 2 showing a flow chart with steps according to the present invention.

The steps as presented in FIG. 2 are preferably carried out in a camera being operated by a user. In the first step, 201, the camera provides disposability information comprising at least one capturing parameter of the camera towards a synchronization module.

As described above the provision of the information about the disposability of the cameras may be performed in any suitable and preferably way. In one embodiment it is proposed that the cameras register their self in the system. For example the users of cameras may initiate the placing of the required information at the server. Furthermore, the cameras may either register in advance or when capturing the session. It may be performed either by contacting a server or by sending a registration message via the telecommunication network.

The disposability message may comprises capturing parameters of the camera, like location of the camera, for example coordinates from the in-built GPS module of the camera and the orientation of the camera, or coordinates from the in-built compass module or acceleration sensors, or network cell information provided by a mobile network the camera is connected to. Furthermore as aforementioned, the technical capabilities of the camera may be provided, which may be the camera type, camera lens parameters like focal length, supported frame rates, spatial resolutions, video codecs, storage space, upload and/or upstreaming capabilities.

In the next step, 202, the camera waits for receiving the multi-view parameter as determined in the synchronization module. Thus the selected camera is notified about the synchronized time, determined using preferably the NTP as described above, further it may be notified about the exact start time of the capturing session, duration of the capturing session, the used frame rate, depending on the kind of multi-view session. Consequently, in step 203 the camera starts the capturing of the session using the received multi-view parameter.

In the next step, 204 the camera provides the captured session to a server for generating a multi view session. The processing of the session to achieve a multi-view session is performed as aforementioned.

Further it is proposed that the cameras are adapted to provide updates to the capturing parameters of the camera for updating the multi-view capturing parameter. This may happen before starting the capturing or during the capturing of a scene. For example the position of the camera may change during the capturing and in order to provide a complete picture, said update is to be sent to the synchronization module.

Figure 3:
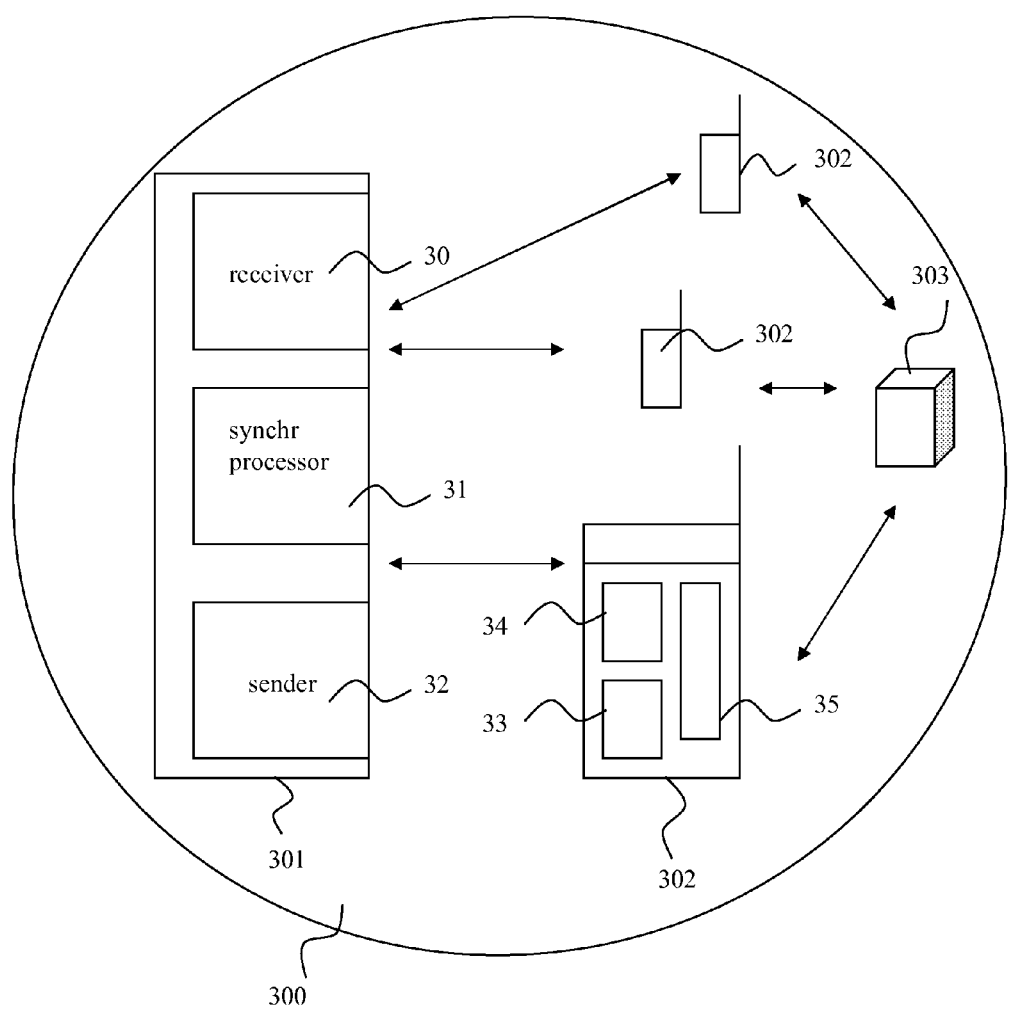
FIG. 3 is block diagram illustrating embodiments of network.

FIG. 3 schematically illustrates a telecommunication network 300 with synchronization module 301, a number of cameras 302 capturing a multi-view scene 303. In one of the cameras 302 the components of the camera according to one embodiment of the invention are depicted.

The cameras and the synchronization module may be located in the same communication network. In another embodiment it is proposed that the cameras are connected by a first communication network, for example by a short range network and the communication with the synchronization module is performed over a second communication network, like a wide range network, for example, GSM, UMTS or LTE.

As becomes apparent from FIG. 3, the synchronization module 301 comprises a receiver 30 adapted to receive a disposability message from the cameras. In a preferred embodiment the disposability message is a registration message registering at least one camera for capturing a session with at least one capturing parameter of the camera. The receiver may either receive a registration message from the cameras directly or it may get the registration message form a further node for example from a server. At the end, the information about the disposition of the camera for capturing a multi-view session and the capturing parameters of the camera are available.

Further the synchronization module comprises a synchronization processor 31 for performing a synchronization procedure to synchronize cameras capturing the multi-view session. The synchronization procedure is adapted to determine at least one multi-view capturing parameter by considering the capturing parameter of the at least one camera. Furthermore, a sender 32 is adapted to notify the cameras capturing the multi-view session about the at least one multi-view capturing parameter.

The synchronization module 301 communicates with the cameras 302 in any suitable way. The camera, 302 comprises a sender 33 adapted to send a disposability message. Further, the camera comprises a receiver 34 adapted to receive a notification message from the synchronization module 301. The notification message is foreseen to provide at least one multi-view capturing parameter for capturing a multi-view session. The camera 302 is adapted to use the received at least one multi-view capturing parameter for capturing a session in a way to provide a synchronized multi-view session. The capturing of the session is performed by means of a capturing unit 35 adapted to capture a session.

Figure 4:
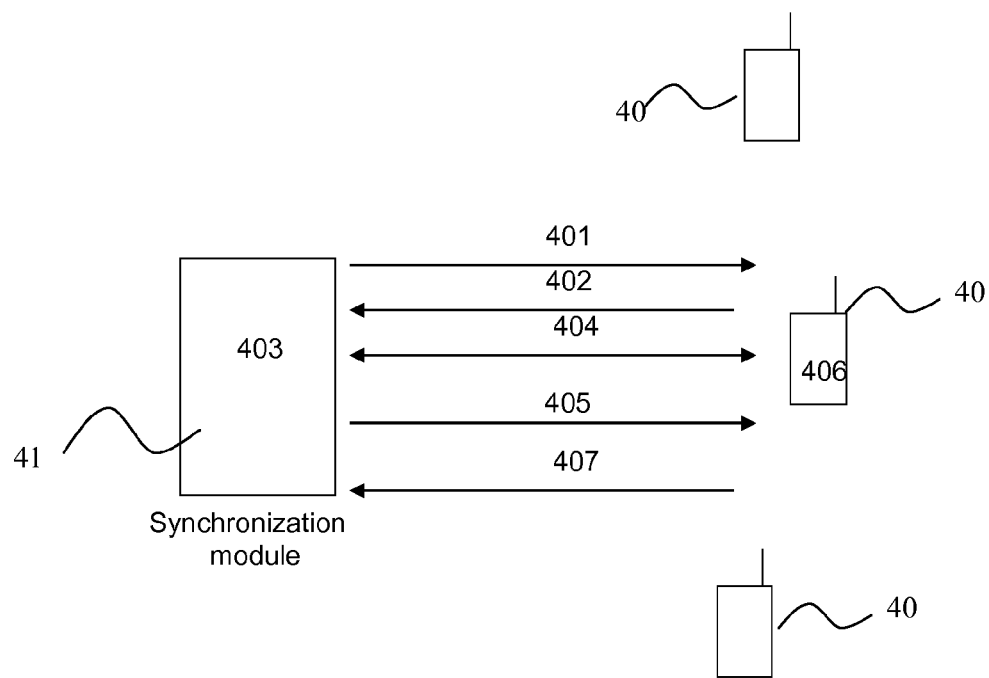
FIG. 4 is signalling diagram illustrating exchange of signals in an embodiment.

In the following an embodiment of the present invention is presented in respect to FIG. 4 which depicts an implementation embodiment of the present invention in a wireless network. In FIG. 4 a number of mobile cameras, 40, is depicted enabled to capture a scene. The cameras 40 have the possibility to communicate with the synchronization module, 41.

With the first message, 401, the synchronization module sends an announcement message announcing to the mobile cameras session to be captured. The mobile cameras may be located for example in a certain spatial area. The announcement message may be an SMS message including the reference to a capturing session, e.g. in form of a HTTP URL. In the next step 402, the mobile cameras 40 send a registration message to the synchronization module, 41. This message may be for example a HTTP GET request which includes a registration message encoded in the HTTP URL or in the HTTP header or body section.

The registration message may comprise the location of the camera, furthermore the capabilities of the camera like camera type, camera lens parameters, supported frame rates, spatial resolutions, video codecs, storage space, upload and/or upstreaming capabilities.

In step, 403 the synchronization module upon receipt of the registration message from the different cameras starts to perform the synchronization procedure. In the present embodiment the synchronization module compares the content of the registration messages to select cameras with similar capabilities for a common session as already described. The result of the synchronization procedure is a list of the selected cameras and the determined multi-view capturing parameter.

According to FIG. 4, in the frame of the synchronization procedure, the time synchronization is conducted, step 404. This may be performed using the NTP protocol as defined in RFC1305. Here, the camera may send a time synchronization request to the server, which initiates a clock synchronization procedure according to RFC1305.

In the following step, 405, the mobile cameras are notified about the multi-view capturing parameters, in this example about the exact start time of the capturing session and the used frame rate. For example, the registration message in step 402 may be transmitted via HTTP. In that case, the server may send the multi-view capturing parameters through the existing HTTP connection. In another example, the multi-view capturing parameters may be sent by SMS or via a broadcast network such as DVB or 3GPP MBMS.

Upon reception of the notification message, step 406, the mobile camera is activated and starts capturing at the advised start time. This means that a capturing module included in the mobile camera is activated, and a capturing application may be executed.

The captured session is provided to a server, step 407, wherein it may be either upstreamed to the server during the session or uploaded after recording the video locally. The upstreaming may be realized through an existing HTTP connection between camera and server, for example using the HTTP connection established for transmission of the registration message, step 402. In another example, the client may initiate a dedicated HTTP or other connection for that purpose. In case of upstreaming the camera encodes the captured information, for example video frames according to a video coding standard such as H.264/AVC. The encoded frames may be sent immediately after encoding. In the case of upload after local recording, the camera may encode the video frames and store the encoded representation in a memory that is connected to the camera. When the session capturing has finished, the encoded and recorded captured information may be uploaded to the server for example by means of HTTP uploading connection.

The processing of the captured data may be performed in any suitable way. Some embodiments are presented above.

While the current invention has been described in relation to its preferred embodiments, it is to be understood that this description is for illustrative purposes only.

The invention claimed is:

1. A method for synchronizing a plurality of cameras connected via a telecommunication network for capturing a multi-view session controlled by a synchronization module, the method comprising:
   receiving disposability information of at least one camera for capturing a session, the disposability information comprising at least one capturing parameter of the corresponding camera;
   performing a synchronization procedure for synchronizing the cameras capturing the multi-view session wherein the synchronization procedure comprises:
       determining, based on the capturing parameters of the individual cameras including the received capturing parameter, at least one multi-view capturing parameter by choosing a first multi-view capturing parameter that best matches the corresponding capturing parameters of the individual cameras;
       selecting cameras suitable for the capturing of the multi view session using the chosen first multi-view capturing parameter;
   notifying the selected cameras capturing the multi-view session of the at least one multi-view capturing parameter, including the first multi-view capturing parameter, for the selected cameras to use while capturing the multi-view session.

2. The method of claim 1 further comprising receiving a trigger message initiating the capturing of the multi-view session.

3. The method of claim 1 wherein the receiving disposability information comprises receiving a registration message during a registration procedure for registering the at least one camera.

4. The method of claim 3 wherein the registration procedure comprises sending an announcement message to the plurality of cameras.

5. The method of claim 3 wherein the registration procedure comprises receiving a registration message from the plurality of cameras.

6. The method of claim 1:
   wherein the capturing parameter of the at least one camera comprises location and orientation of the at least one camera;
   wherein determining at least one multi-view capturing parameter comprises determining a multi-view capturing parameter regarding location and orientation based on the location and orientation of the at least one camera.

7. The method of claim 1:
   wherein the capturing parameter of the at least one camera comprises technical capabilities of the camera;
   wherein determining at least one multi-view capturing parameter comprises determining a multi-view capturing parameter based on the technical capabilities of the at least one camera.

8. The method of claim 1 further comprises synchronizing the capturing in time so that scenes captured by different cameras of the selected cameras correspond.

9. The method of claim 1 further comprising determining a synchronized session starting time.

10. The method of claim 1 further comprising providing additional information for updating the multi-view capturing parameter by a server connected with the synchronization module.

11. The method of claim 1 further comprising providing, by the at least one camera, updates to the at least one capturing parameters.

12. The method of claim 1 wherein the notifying comprises instructing at least one of the selected cameras about adapting its capturing parameters.

13. A method for synchronizing cameras connected via a telecommunication network for capturing a multi-view session, the method comprising, at a first camera:
    providing disposability information comprising at least one capturing parameter of the first camera towards a synchronization module;
    receiving, at the first camera, a notification message generated by the synchronization module comprising a first multi-view capturing parameter for capturing the multi-view session, wherein the first multi-view capturing parameter is chosen based on corresponding capturing parameters of individual cameras selected for capturing of the multi view session with the multi-view capturing parameter, wherein the chosen first multi-view capturing parameter best matches the corresponding capturing parameters of the selected cameras;
    capturing a session using the first multi-view capturing parameter.

14. The method of claim 13 further comprising the first camera providing the captured session to a server for generating a synchronized multi-view session.

15. The method of claim 13 wherein the first camera comprises the synchronization module, wherein the synchronization module is configured to:
    receive disposability information of at least one other camera for capturing a session, the disposability information comprising at least one capturing parameter of the corresponding camera;
    perform a synchronization procedure for synchronizing cameras capturing the multi-view session, the synchronization procedure comprising:
        determining at least one multi-view capturing parameter, based on the capturing parameters of the individual cameras including the capturing parameter of the first camera and the second camera, by choosing a multi-view capturing parameter best matching the corresponding capturing parameters of the individual cameras as the first multi-view capturing parameter;
        selecting cameras suitable for the capturing of the multi view session using the chosen first multi-view capturing parameter;
    notify the selected cameras capturing the multi-view session of the at least one multi-view capturing parameter, including the first multi-view capturing parameter, for the selected cameras to use the at least one multi-view capturing parameter while capturing the multi-view session.

16. A synchronization module for synchronizing cameras connected via a telecommunication network for capturing a multi-view session controlled by the synchronization module, the synchronization module comprises:

a receiver configured to receive disposability information of at least one camera for capturing a session, the disposability information comprising at least one capturing parameter of the corresponding camera;

a synchronization processor configured to perform a synchronization procedure for synchronizing cameras capturing the multi-view session, the synchronization procedure comprising:

determining, based on the capturing parameters of the individual cameras, at least one multi-view capturing parameter by choosing a multi-view capturing parameter best matching the corresponding capturing parameters of the individual cameras;

selecting cameras suitable for the capturing of the multi view session using the chosen multi-view capturing parameter;

a transmitter configured to notify the selected cameras of the at least one multi-view capturing parameter for the selected cameras to use the at least one multi-view capturing parameter while capturing the multi-view session.

17. A camera device connected via a telecommunication network with further camera devices for capturing a multi-view session, the camera device comprising:

a transmitter configured to send disposability information to a synchronization module, the disposability information comprising at least one capturing parameter of the camera device;

a receiver configured to receive a notification message from the synchronization module comprising a multi-view capturing parameter for capturing the multi-view session, wherein the multi-view capturing parameter is based on capturing parameters of the individual cameras selected for the capturing of the multi view session with the multi-view capturing parameter, wherein the multi-view capturing parameter best matches the capturing parameters of the individual cameras;

a capturing unit configured to capture a session using the multi-view capturing parameter.

* * * * *